Feb. 20, 1951
J. J. FISCHER ET AL
2,542,917
DIFFERENTIAL SPOOL DRIVE
Filed Jan. 2, 1947
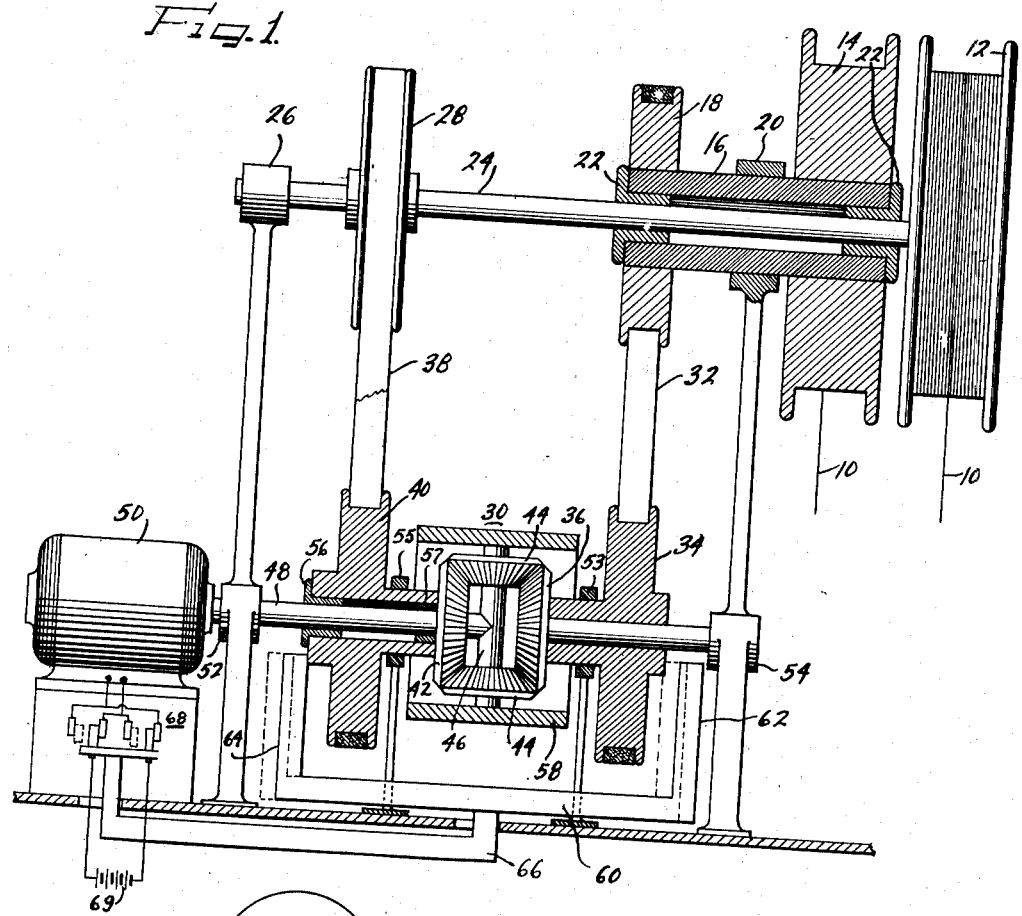
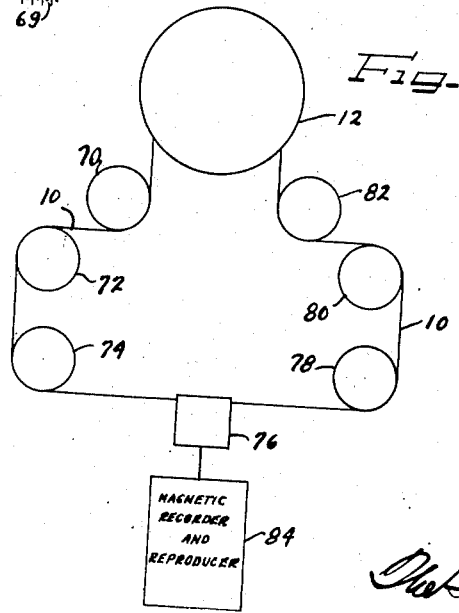
INVENTORS
JOHN J. FISCHER
DONALD W. HADLEY.
BY
ATTYS Patented Feb. 20, 1951

2,542,917

UNITED STATES PATENT OFFICE 2,542,917

DIFFERENTIAL SPOOL DRIVE

John J. Fischer, Chicago, and Donald W. Hadley, Evanston, Ill., assignors to Armour Research Foundation of Illinois Institute of Technology, Chicago, Ill., a corporation of Illinois Application January 2, 1947, Serial No. 719,830

4 Claims. (Cl. 242—54)

Our invention relates to winding and reeling mechanisms and more particularly to driving mechanisms therefor.

It is an object of our invention to provide an improved winding and reeling mechanism wherein the velocity of the medium being wound may be maintained substantially constant.

It is a further object of our invention to provide an improved winding and reeling mechanism wherein the linear velocity of the medium wound is maintained substantially constant without the use of a capstan or similar auxiliary drive means and which maintains the medium taut during transfer.

Another object of our invention is to provide a winding and reeling mechanism wherein substantially constant linear velocity is imparted to the medium when the mechanism is driven by a constant speed motor even though the spools or medium supporting devices driven by the mechanism vary in diameter by reason of the medium stored thereon.

Further it is an object of our invention to provide an improved winding and reeling mechanism capable of imparting substantially constant linear velocity to the medium wound and having features of construction, combination, and arrangement, whereby a maximum degree of simplicity is achieved, to the end that the cost of construction and maintenance be minimized.

Yet another object of our invention is to provide an improved winding and reeling mechanism inherently capable of imparting to the medium wound a substantially constant linear velocity and adaptable to be reversed in a simple and convenient manner.

The novel features which we believe to be characteristic of our invention are set forth with particularity in the appended claims. Our invention, itself, however, both as to its organization and method of operation, together with further objects and advantages thereof, may best be understood by reference to the following description taken in connection with the accompanying drawings.

On the drawing:

Figure 1 is a side and partial cross-section view of a winding and reeling mechanism incorporating the features of our invention; and Figure 2 is a somewhat diagrammatic view of a winding and reeling mechanism constructed as shown in Figure 1 as applied to a magnetic recorder or reproducer.

As shown on the drawing:

In the view of Figure 1, the two devices upon which the medium 10 is stored are designated by 12 and 14 respectively. Spool 14, shown in cross-section, is mounted on hollow stub-shaft 16 to rotate therewith, as is pulley 18. Shaft 16 is rotatably supported on bearing 20 and on bearings 22, the latter being mounted on shaft 24. It will be observed that the bearings 22, acting in conjunction with bearing 20, together with bearing 26, provide support for both shaft 16 and shaft 24, limiting motion of both shafts to rotation about their common axis. Spool 12 and pulley 28 are mounted to rotate with shaft 24.

The spools 12 and 14 are driven through pulleys 28 and 18, respectively, by the differential drive system shown generally at 30. It is the purpose of this system to vary automatically the relative velocity of the spools 12 and 14 so as to maintain medium 10 at a substantially constant linear velocity when the mechanism 30 is driven at a constant angular velocity. To this end, pulley 18 is connected by belt 32 to pulley 34, pulley 34 being connected to differential output gear 36. Likewise, pulley 28 is connected by belt 38 to pulley 40 which in turn is connected to differential output gear 42. The differential output gears 36 and 42 are mounted in coacting relationship with the differential pinions 44 which are rotatably mounted about a common shaft 46 which is rotated in turn by drive shaft 48, to which is connected motor 50.

The shaft 48, together with the pulleys 34 and 40 and the differential mechanism 30, is supported by bearings 52, 53, 54, and 55. In the case of pulley 40 and differential gear 42, this support is derived from auxiliary bearings 56 and 57 mounted on shaft 48. The differential gear mechanism 30 is protected by housing 58 which derives support from shaft 46.

It is desirable to oppose rotation of the unwinding spool so as to maintain medium 10 in a taut condition as it is transferred. To this end brake 60 is provided, this brake being selectively engageable to oppose rotation of pulleys 34 or 40. This brake is provided with two arms 62 and 64 capable of engaging the surfaces of pulleys 34 and 40 respectively. Thus, when brake 60 is in the position shown in the view of Figure 1, rotation of pulley 40 is opposed whereas when brake 60 is moved to the position shown in the dotted lines of Figure 1, rotation of spool 34 is opposed. This change in the operation of brake 60 is achieved by sliding operating member 66.

In a practical winding and reeling device, such as might be used with a magnetic recorder or reproducer, it is desirable to reverse the direction of motion of medium 10 by a single simple operation. The device of Figure 1 is particularly adaptable to such an arrangement. For example, a motor 50 of the type having direction of rotation determined by the polarity of an applied electric current may be employed and switch 68 provided to accomplish such reversal. An arrangement of this type is shown in somewhat diagrammatic fashion in Figure 1, the motor 50 deriving energizing current from battery 69. By connecting switch 68 to the operating arm 66 of brake 60 the motor 50 may be reversed simultaneously with the change in the operation of brake 60, thereby enabling simple and effective reversal of the direction of motion of medium 10. Alternatively, a mechanical reverse utilizing gears or the like may be utilized for this purpose.

Figure 2 is a view illustrating in diagrammatic fashion the application of our winding and reeling mechanism to a magnetic recording or reproducing mechanism. This view corresponds to a side view taken from the right of Figure 1 but shows only the spool 12 and the medium 10. As shown in this view, the medium 10 passes from spool 12 over pulleys 70, 72, and 74 through magnetic recording and reproducing head 76. After passing through this head the medium 10 passes over pulleys 78, 80 and 82 to be wound upon spool 14 (hidden from view by spool 12). A magnetic recorder and reproducer 84 is connected to recording and reproducing head 76. In the recording operation this device is capable of converting the sound waves associated with speech, for example, to an electromotive force varying with the intensity thereof which, when applied to head 76, produces a time varying magnetic field. As the medium 10 passes over head 76, therefore, the time varying magnetic field at the head is converted to variations in magnetization along the length of medium 10. In the reproducing operation, the medium 10, passing over head 76, produces an electromotive force having time variations in intensity in accord with the magnetic variation on medium 10. The resultant varying electromotive force is then amplified in magnetic recorder and reproducer 84 and applied to a loud speaker or similar device to reproduce the original sound wave.

One of the desirable features of a magnetic recording and reproducing mechanism is constancy of velocity of the medium as this provides a uniform degree of excellence in recording and reproducing regardless of the condition of the storage spools. In accordance with our invention this performance is achieved by driving spools 12 and 14 in such fashion that the sum of the angular velocities thereof is a constant value at all times, thereby causing one spool to increase in angular velocity as the other decreases and visa versa. In the specific structure shown in Figure 1, for example, this is accomplished by differential mechanism 30 which causes rotation of pulleys 34 and 40 at angular velocities which, when added, are equal to twice the angular velocity of shaft 48.

The effectiveness of our invention in maintaining constant velocity of medium 10 when shaft 48 is operated at a constant angular velocity may best be understood by the following mathematical analysis:

Let:
$w_x$ = instantaneous angular velocity of spool 14
$w_y$ = instantaneous angular velocity of spool 12
$w_0$ = the angular velocity of spools 12 and 14 when containing same amount of wire and motor 50 is rotating at a predetermined angular velocity.
$r_x$ = instantaneous radius of spool 14
$r_y$ = instantaneous radius of spool 12
$R_0$ = minimum radius of spools 12 and 14
$R_f$ = maximum, fully loaded, radius of spools 12 and 14.

It can be shown that the differential 30 has the property that:

(1) $$w_x + w_y = 2w_0$$

But since the velocity of medium 10 as it leaves one spool must equal the velocity it winds on the other:

(2) $$w_x r_x = w_y r_y$$

Combining and solving Equations 1 and 2:

(3) $$w_s r_s = 2w_0 \frac{r_x r_y}{r_x + r_y}$$

Since $w_x r_x$ is the linear velocity of medium 10, Equation 3 gives the variation of that velocity with the instantaneous diameters of spools 12 and 14. Since the total volume of medium 10 on spools 12 and 14 is constant:

$$\pi r_x^2 - \pi R_0^2 + \pi r_y^2 - \pi R_0^2 = \pi R_f^2 - \pi R_0^2$$

or:

(4) $$r_x^2 + r_y^2 = R_f^2 + R_0^2$$

Substituting Equation 4 into Equation 3, it can be shown that minimum velocity of medium 10 occurs when $r_x = R_0$ and $r_y = R_f$.

Then:

(5) $$w_s r_s = 2w_0 \frac{R_0 R_f}{R_0 + R_f}$$

Similarly, it can be shown that maximum velocity of medium 10 occurs when $r_y = r_x$.

(6) $$w_s r_s = w_0 \sqrt{\frac{R_0^2 + R_f^2}{2}}$$

Under any given conditions of operation the improvement in performance of a winding and reeling device constructed in accord with this invention may be compared with a conventional system by substituting in Equations 5 and 6. If, for example, the ratio of $R_0$ to $R_f$ is 0.91, a conventional drive mechanism will cause approximately 10 percent variation in the velocity of the medium whereas a drive system constructed in accord with our invention causes the medium to have less than one half of one percent change in velocity. From these values it is evident that the winding and reeling device constructed in accord with this invention provides substantially improved performance.

While we have shown and described the use of differential gearing to cause the angular velocities of shafts 16 and 24 to total a constant value, it will be evident that other means, such as differential electric motors, may be used for this purpose.

It will be evident to those skilled in the art that it is desirable to provide a level winding device to achieve a uniform distribution of the medium 10 over the spools 12 and 14 so as to avoid the velocity variations of medium 10 associated with uneven deposit of that medium across the spools.

While we have shown a particular embodiment of our invention, it will of course be understood that we do not wish to be limited thereto since many modifications both in the elements employed and the cooperative structure disclosed may be made without departing from the spirit and scope thereof. We, of course, contemplate by the appended claims to cover all such modifications as fall within the true spirit and scope of our invention.

What we claim is new and desire to secure by Letters Patent in the United States is:

1. A reversible winding and reeling mechanism comprising in combination, a pair of medium supporting devices, a medium wound about said devices and transferable therebetween, and a differential drive for said devices, said drive including a drive element and a pair of driven elements, means connecting said driven elements to said devices so that rotation of said drive element causes said medium to wind on one device and reel from the other device, the sum of the angular velocity of said one device in the wind direction and said other device in the reel direction being proportional to the angular velocity of said drive element, reversible means to rotate said drive element at substantially constant angular velocity so as to transfer said medium in either direction at substantially constant linear velocity, and brake means interconnected with said last means to oppose rotation of said one device or said other device in accord with the direction of motion of said medium so as to maintain taut said medium.

2. In a winding and reeling mechanism, a drive gear, a pair of driven gears in engagement with said drive gear at diametrically opposed points and having a common axis of rotation, said axis being transverse to the axis of rotation of said drive gear, a pair of medium supporting devices, a medium wound about said devices and transferable therebetween, means connecting said devices to said driven gears so that rotation of said drive gear about the axis of said driven gears causes said medium to be transferred between said devices, means to rotate said drive gear about the axis of said driven gears at a substantially uniform angular velocity, whereby said medium is transferred at substantially constant linear velocity, and means selectively to oppose rotation of one of said driven gears to maintain taut said medium, said last two means being interconnected so that said last means opposes rotation of the device from which said medium is reeled.

3. The combination in a winding and reeling mechanism of a first medium supporting device, a second medium supporting device, a medium wound about said devices to be transferable therebetween by rotation thereof, means supporting said devices in axial alignment, a first wheel, a second wheel, mechanism connecting said first wheel to said first medium supporting device for rotation therewith, mechanism connecting said second wheel to said second medium supporting device for rotation therewith, elements supporting said first wheel and said second wheel in axial alignment, and a drive wheel disposed intermediate said first wheel and said second wheel and engaging said wheels at opposite points on its periphery to impart take-up rotation to one of said devices when unwinding rotations are imparted to the other of said devices.

4. In a winding and reeling mechanism, a drive gear, a pair of driven gears in engagement with said drive gear at diemetrically opposed points and having a common axis of rotation, said axis being transverse to the axis of rotation of said drive gear, a pair of medium supporting devices, a medium wound about said devices and transferable therebetween, means connecting said devices to said driven gears so that rotation of said drive gear about the axis of said driven gears causes said medium to be transferred between said devices, reversible drive means to rotate said drive gear about the axis of said driven gears at a substantially uniform angular velocity whereby said medium is transferred at substantially constant linear velocity, and brake mechanism selectively operable upon reversal of said reversible drive means to retard rotation of the device from which said medium is unwound.

JOHN J. FISCHER.
DONALD W. HADLEY.

REFERENCES CITED

The following references are of record in the file of this patent:

UNITED STATES PATENTS

| Number | Name | Date |
| --- | --- | --- |
| 2,021,208 | Wildy | Aug. 20, 1935 |
| 2,091,756 | Fodor | Aug. 31, 1937 |

FOREIGN PATENTS

| Number | Country | Date |
| --- | --- | --- |
| 771,451 | France | July 23, 1934 |